(12) United States Patent
Tang et al.

(10) Patent No.: US 10,175,411 B2
(45) Date of Patent: Jan. 8, 2019

(54) PROTECTIVE COVER

(71) Applicant: ASUSTeK COMPUTER INC., Taipei (TW)

(72) Inventors: Wei-Hsiang Tang, Taipei (TW); Lian-Tien Ke, Taipei (TW); Chung-Jen Chung, Taipei (TW); Sheng-Chieh Huang, Taipei (TW); Tzu-Jen Mao, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 15/629,925

(22) Filed: Jun. 22, 2017

(65) Prior Publication Data

US 2018/0003881 A1 Jan. 4, 2018

(30) Foreign Application Priority Data

Jun. 29, 2016 (TW) .............................. 105120627 A (51) Int. Cl.
*F21V 7/04* (2006.01)
*F21V 8/00* (2006.01)
*H04B 1/3888* (2015.01)

(52) U.S. Cl.
CPC .......... *G02B 6/0035* (2013.01); *G02B 6/0078* (2013.01); *G02B 6/0083* (2013.01); *G02B 6/0095* (2013.01); *H04B 1/3888* (2013.01)

(58) Field of Classification Search
CPC .... G02B 6/0085; G02B 6/0036; G02B 6/005; G02B 6/0046; G02B 6/0073; G02B 6/007; G02B 6/0083; G02B 6/009; H05K 5/03; G06F 1/1613
See application file for complete search history.

(56) References Cited

U.S. PATENT DOCUMENTS

2015/0185408 A1* 7/2015 Hsu ..................... G02B 6/0088
362/606

FOREIGN PATENT DOCUMENTS

| CA | 202680903 U | 1/2013 |
| CN | 201893817 U | 7/2011 |
| CN | 202680903 U | 1/2013 |
| CN | 203575813 U | 5/2014 |
| TW | M404572 U | 5/2011 |
| TW | M445325 U | 1/2013 |
| TW | I503090 B | 10/2015 |

OTHER PUBLICATIONS

Office Action issued in corresponding Taiwan patent application dated Jun. 27, 2017.

* cited by examiner

*Primary Examiner* — Ali Alavi
(74) *Attorney, Agent, or Firm* — McClure, Qualey & Rodack, LLP (57) ABSTRACT

A protective cover adaptive to an electronic device is provided. The protective cover comprises a connecting portion, a cover body and a light guide plate. A side of the cover body is connected to the connecting portion and is movable relative to the connecting portion. The light guide plate includes a light input surface, an attachment surface, and a light output surface. The light input surface and the attachment surface are opposite to each other. The light guide plate is connected to the cover body via the attachment surface and light from a light source is transmitted through the light input surface and output from the light output surface.

12 Claims, 10 Drawing Sheets

PROTECTIVE COVER

CROSS-REFERENCE TO RELATED APPLICATION

This application claims the priority benefit of Taiwan application serial No. 105120627, filed on Jun. 29, 2016. The entirety of the above-mentioned patent application is hereby incorporated by references herein and made a part of specification.

BACKGROUND OF THE INVENTION

Field of the Invention

The disclosure relates to a protective cover and, more specifically, to a protective cover with a light guide plate.

Description of the Related Art

Mobile devices become popular nowadays. Protection means designed for the mobile devices, such as protective covers, are common on the market. To protect the mobile device, the mobile device is usually covered by the protective cover to prevent information displayed on the mobile device from being peeped by others.

BRIEF SUMMARY OF THE INVENTION

According to an aspect of the disclosure, a protective cover adaptive to an electronic device is provided. The protective cover comprises a connecting portion, a cover body, and a light guide plate. A side portion of the cover body is connected to the connecting portion. The light guide plate including a light input surface, an attachment surface, and a light output surface, the light input surface and the attachment surface are opposite to each other. The light guide plate is connected to the cover body via the attachment surface, and light from a light source is transmitted through the light input surface and output from the light output surface.

In embodiments, the user knows the particular trigger event from the changes of the light (which comes out of the light guide plate) without opening the cover body.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

Multiple embodiments are disclosed below accompanying with the figures. For clarity, practical details are also described hereinafter, which are not used for limiting the disclosure. In other words, in some of the embodiments, some practical details are not essential. Additionally, for concise illustration, some commonly-used components or structures in the art are shown simply in the figures.

Figure 1:
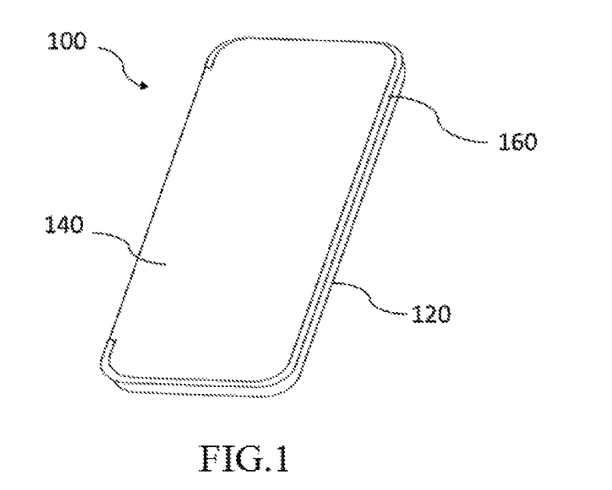
FIG. 1 is a perspective view of an electronic device and a protective cover in an embodiment.
Figure 2:
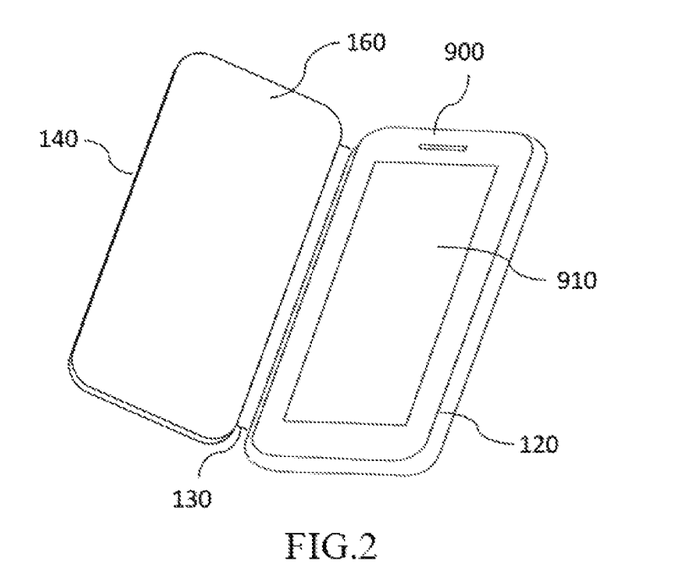
FIG. 2 is a perspective view of an electronic device and a protective cover in an embodiment.
Figure 3:
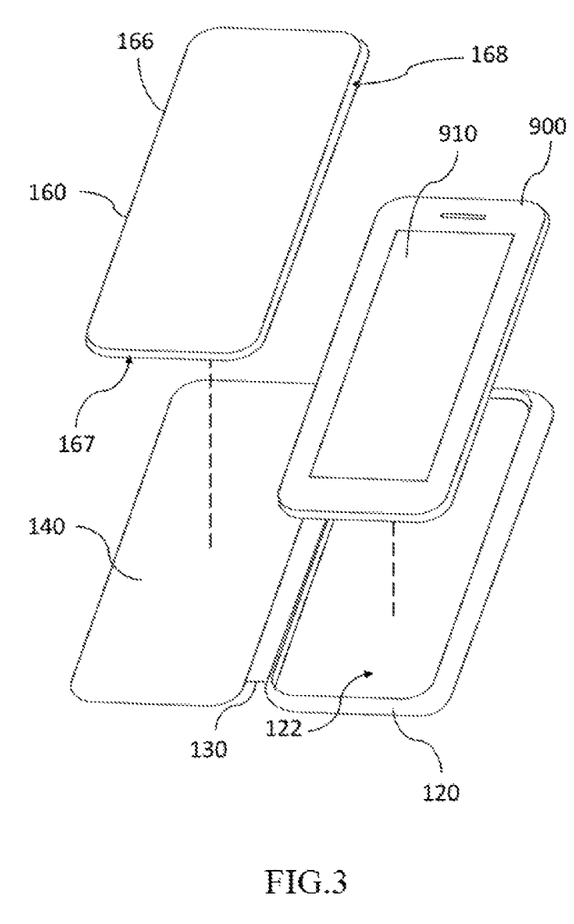
FIG. 3 is an exploded view of an electronic device and a protective cover in an embodiment.

FIG. 1 is a perspective view of an electronic device 900 and a protective cover 100 in an embodiment. FIG. 2 is a perspective view of an electronic device 900 and a protective cover 100 in an embodiment. FIG. 3 is an exploded view of an electronic device 900 and a protective cover 100 in an embodiment. Please refer to FIG. 1 to FIG. 3. In an embodiment, a protective cover 100 is adapted to an electronic device 900 with a screen 910. The protective cover 100 includes a main body 120, a connecting portion 130, a cover body 140 and a light guide plate 160. The cover body 140 connects to the connecting portion 130. The main body 120 includes an accommodating portion 122 to accommodate the electronic device 900. The screen 910 of the electronic device 900 is covered or uncovered by converting the cover body 140 when the electronic device 900 is received in the accommodating portion 122. A side portion of the cover body 140 is connected with the connecting portion 130. Thus, the accommodating portion 122 is covered (as shown in FIG. 1) or exposed (as shown in FIG. 3) by converting the cover body 140. In an embodiment, the cover body 140, the connecting portion 130 and the main body 120 are formed integratedly. In an embodiment, any two adjacent ones of the cover body 140, the connecting portion 130 and the main body 120 are formed integratedly. In an embodiment, any two adjacent ones of the cover body 140, the connecting portion 130 and the main body 120 are formed individually and combined together by hot pressing, bonding or the like. In an embodiment, any two adjacent ones of the cover body 140, the connecting portion 130 and the main body 120 are permanently or temporarily connected via a fastening member, such as a rivet, a fastener and so on. In an embodiment, the cover body 140 and the connecting portion 130 are made of flexible materials (such as, leather materials, natural or synthetic rubber or other polymers (such as polyurethanes)). In an embodiment, the electronic device is an electronic device with a screen, such as a smart phone and a tablet personal computer, which is not limited herein. In the embodiment, the electronic device is a smart phone.

The light guide plate 160 includes a light input surface 166, an attachment surface 167 and at least a light output surface 168. The light input surface 166 and the attachment surface 167 are opposite to each other. The light output surface 168 extends along the periphery of light guide plate 160. The light guide plate 160 is connected to the cover body 140 via the attachment surface 167 by a gluing or hot pressing process. In an embodiment, the light output surface 168 of the light guide plate 160 is configured corresponding to a top surface, a side surface or a bottom surface of the electronic device 900. When the electronic device 900 is covered by the cover body 140 (as shown in FIG. 1), the light from the screen 910 is transmitted through the light input surface 166 and output from the light output surface 168. In such a way, when an incoming call, a message, an email, a twitter message or any kind of notification is received, or a calendar reminder or other events is triggered, the electronic device 900 lights up on the screen 910 in a particular arrangement that presets in advance. Thus, the light output surface 168 of the light guide plate 160 is illuminated based on the particular arrangement of the light from the screen 910. In an embodiment, the light guide plate 160 is intermittently illuminated slowly or rapidly, or the brightness or the color changes gradually alone the light output surface 168, which is not limited herein. In an embodiment, the material of the light guide plate 160 is transparent or translucent, such as acrylic and plastic materials.

Figure 4:
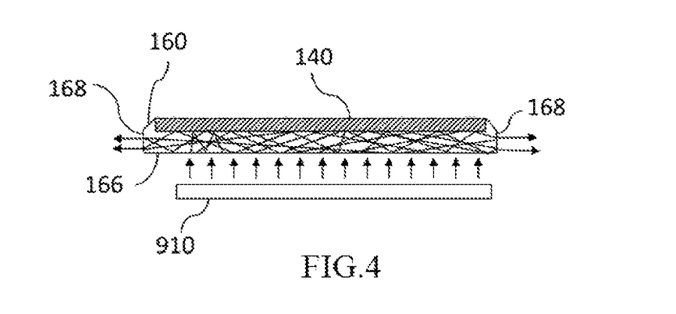
FIG. 4 is a schematic diagram showing an operating principle of a light guide plate in an embodiment.

FIG. 4 is a schematic diagram showing a light transmitting way with the light guide plate 160 in an embodiment. As shown in FIG. 4, arrows indicate the direction of the light. The light from the screen 910 is transmitted into the light guide plate 160 via the light input surface 166, reflected by the cover body 140, and then output via the light output surface 168.

Figure 5A:
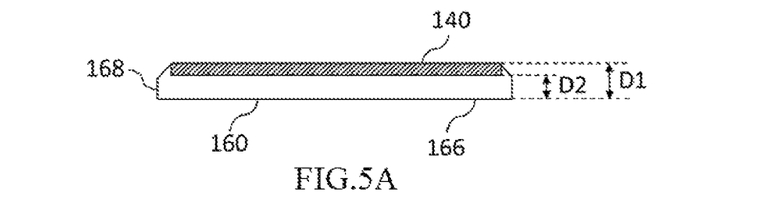
FIG. 5A is a side view of a light guide plate and a cover body in an embodiment.
Figure 5B:
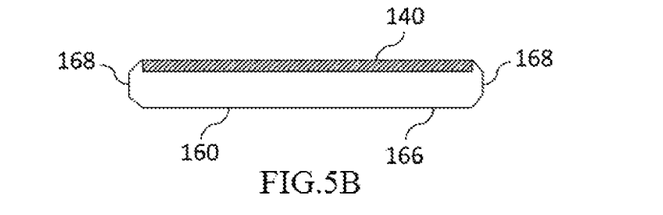
FIG. 5B is a side view of a light guide plate and a cover body in an embodiment.
Figure 5C:
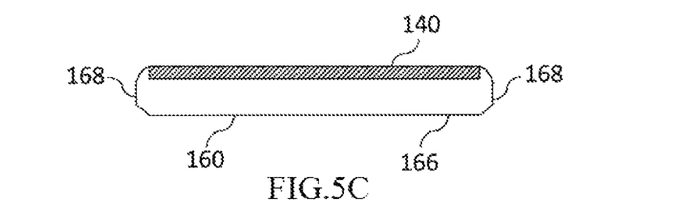
FIG. 5C is a side view of a light guide plate and a cover body in an embodiment.

FIG. 5A to FIG. 5C are side views of a light guide plate 160 and a cover body 140 in embodiments. As shown in FIG. 5A, the light output surface 168 of the light guide plate 160 is a flat and smooth surface to facilitate the emitting of the light. In an embodiment, the light output surface 168 of the light guide plate 160 is perpendicular to the light input surface 166. In an embodiment, an angle is formed between the light output surface 168 and the light input surface 166. In FIG. 5B, in an embodiment, the light output surface 168 includes a surface which is perpendicular to the light input surface 166, and inclined surfaces at both ends of the surface (which is perpendicular to the light input surface 166). In FIG. 5C, in an embodiment, the light output surface 168 includes a surface which is perpendicular to the light input surface 166, a curved surface at an upper end of the surface, and an inclined surface at a lower end of the surface. The light throughput efficiency of a flat surface is higher than that of a curved surface. Therefore, the light coming out of the upper curved surface is weaker than the light coming out of the surface which is perpendicular to the light input surface 166 or the lower inclined surface.

As shown in FIG. 5A, a thickness D1 of the light output surface 168 of the light guide plate 160 is larger than a distance D2 between the light input surface 166 and the attachment surface 167. In other words, the light guide plate 160 extends to the periphery of the cover body 140. Therefore, when a user looks straight to the protective cover, the user can easily see the light output from the light output surface 168.

Figure 6A:
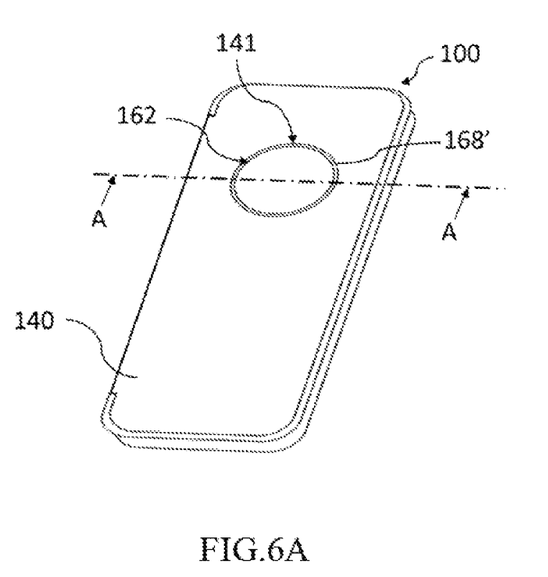
FIG. 6A is a perspective view of a protective cover in an embodiment.
Figure 6B:
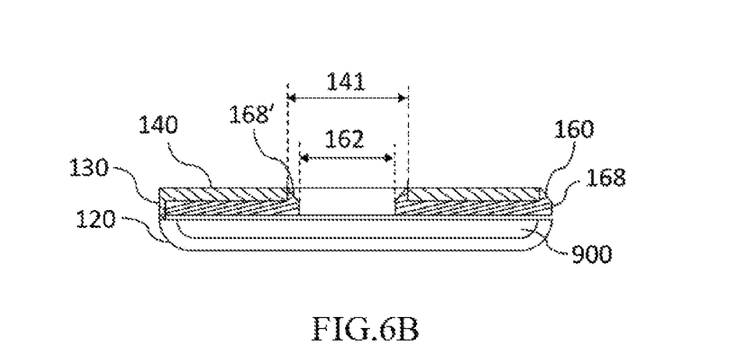
FIG. 6B is a section view of the protective cover along a line A-A in FIG. 6A in an embodiment.

FIG. 6A is a perspective view of a protective cover 100 in an embodiment. FIG. 6B is a section view of the protective cover 100 along a line A-A in FIG. 6A in an embodiment. In an embodiment, the cover body 140 includes a first opening 141. The light guide plate 160 includes a second opening 162 corresponding to the first opening 141. The second opening 162 on the light guide plate 160 exposes the light output surface 168'. The second opening 162 is smaller than the first opening 141. The inner side wall of the second opening 162 extends to an inner edge of the first opening 141 to expose the light output surface 168' from the inner edge of the first opening 141. In an embodiment, the light source of the screen 910 is not corresponding to the first opening 141 and the second opening 162. In an embodiment, part of the screen 910 is exposed from the first opening 141 and the second opening 162 to show a particular information or image.

In embodiments, the number of the first opening 141 and the number of the second opening 162 is more than one according to the requirements. The size or the shape of the first opening 141 is also defined according to the requirements and is not limited herein.

Figure 7A:
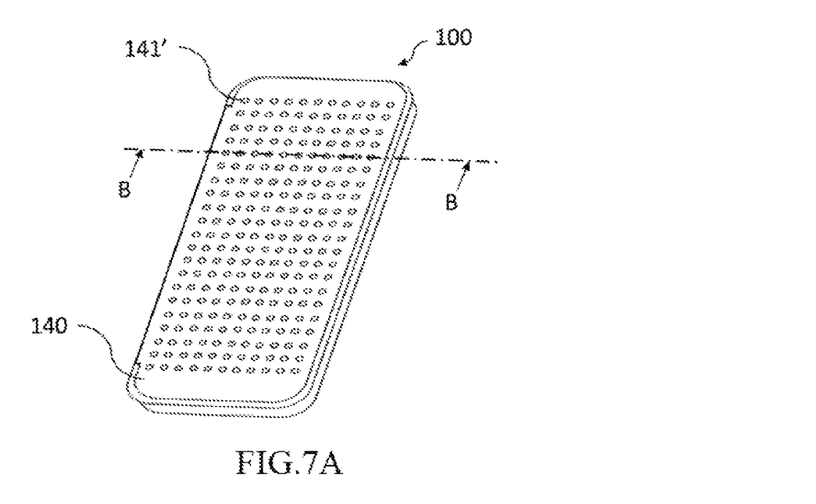
FIG. 7A is a perspective view of a protective cover in an embodiment.

FIG. 7A is a perspective view of a protective cover 100 in an embodiment. In an embodiment, the cover body 140 includes a plurality of the first openings 141'. The first openings 141' are arranged in a matrix distribution. However, in embodiments, the first openings 141' are arranged in other ways. The size or the shape of the first opening 141' is not limited by the figures.

Figure 7B:
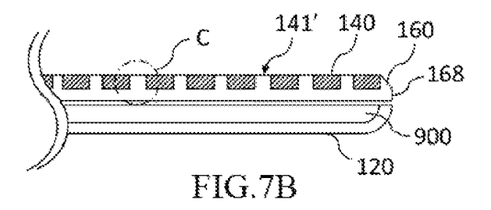
FIG. 7B is a section view of the protective cover along a line B-B in FIG. 7A in an embodiment.

FIG. 7B shows a section view of the protective cover 100 along a line B-B in FIG. 7A. The light is transmitted through the light guide plate 160 and output from the first openings 141' and the light output surface 168. The intensity of the light output from the first openings 141' is weaker than that from the light output surface 168 of the light guide plate 160 for enriching the visual effect.

Figure 7C:
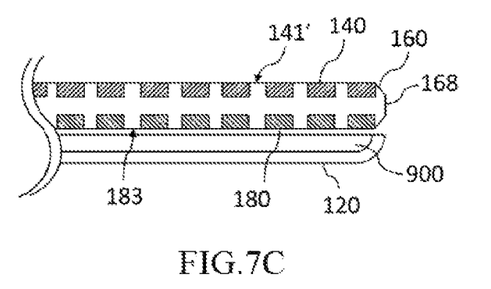
FIG. 7C is a section view of the protective cover along a line B-B in FIG. 7A in an embodiment.

Please refer to FIG. 7C. FIG. 7C is a section view of the protective cover 100 along a line B-B in FIG. 7A in an embodiment. Compared with the protective cover in FIG. 7B, in the embodiment of FIG. 7C, the protective cover 100 further includes a shading body 180. The shading body 180 includes a plurality of third openings 183. The third openings 183 are formed corresponding to the first openings 141'. The light guide plate 160 is disposed between the cover body 140 and the shading body 180 and partially exposed via the third openings 183 and the first openings 141'. In such a way, although a layer of the shading body 180 is positioned between the screen 910 of the electronic device 900 and the light guide plate 160, the light emitted from the screen 910 is transmitted to the light guide plate 160 and output from the light output surface 168 that exposed from the first openings 141'. In the embodiment, since the cover body 140 and the shading body 180 partially cover the light guide plate 160, the protective cover 100 is more aesthetic and provides more user experiences.

Figure 7D:
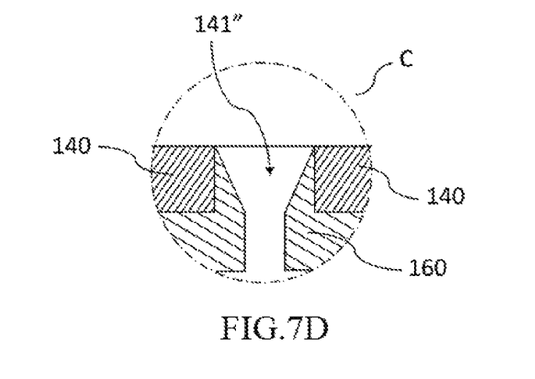
FIG. 7D is a partial enlarged view of a protective cover in an embodiment.

Please refer to FIG. 7D. FIG. 7D is a partial enlarged view (which corresponds to a circle C in FIG. 7B) of the protective cover 100 in an embodiment. The first openings 141" are through holes that formed on the light guide plate 160. Thus, the light output surface of the light guide plate 160 extends to the inner side wall of each of the through holes to output the light.

Figure 8:
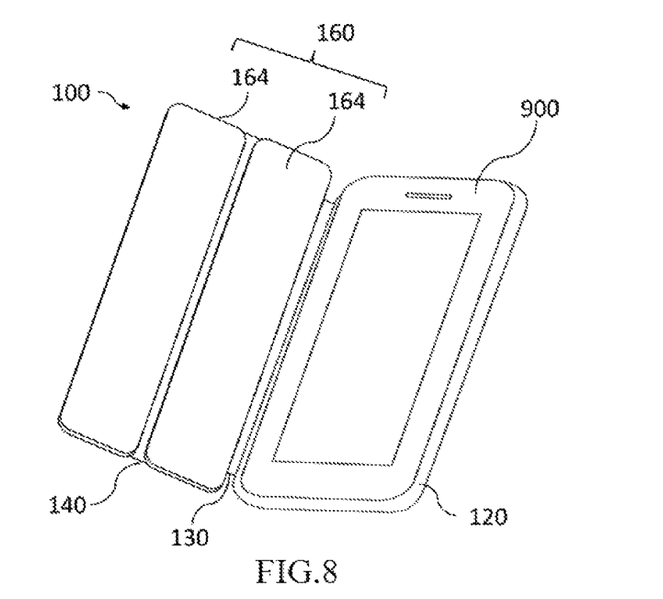
FIG. 8 is a perspective view of a protective cover in an embodiment.

FIG. 8 is a perspective view of a protective cover 100 in an embodiment. The cover body 140 is made of flexible materials for easy bend or fold. In an embodiment, a plurality of sub-plates 164 (such as two sub-plates 164) are further defined on the light guide plate 160. The cover body 140 is folded by arranging the sub-plates 164 in different configurations. Thus, the cover body 140 can be folded to form a stand for supporting the electronic device 900.

Figure 9:
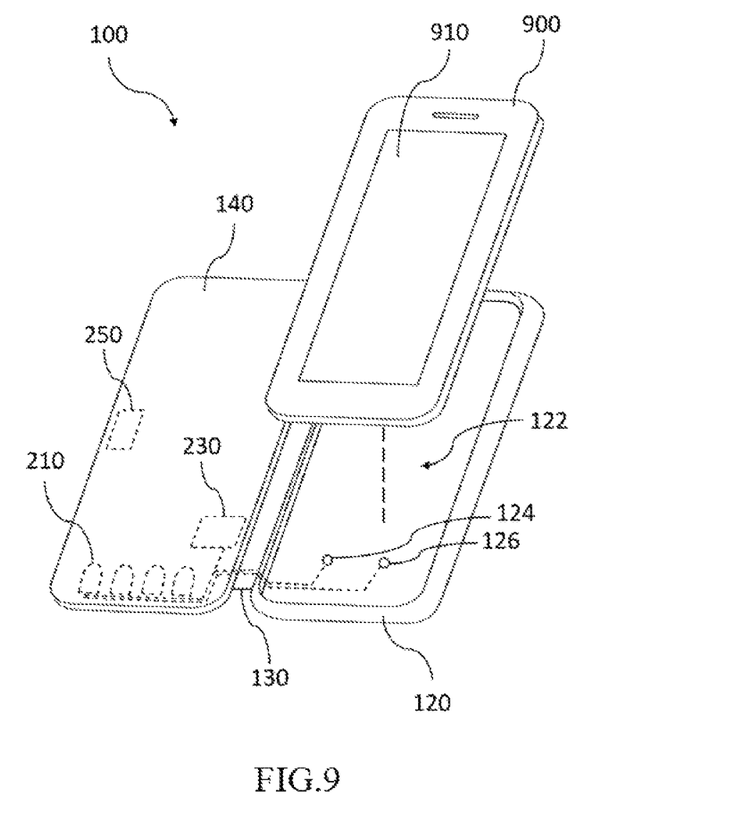
FIG. 9 is an exploded view of an electronic device and a protective cover in an embodiment.

FIG. 9 is an exploded view of an electronic device 900 and a protective cover 100 in an embodiment. In an embodiment, the protective cover 100 further includes one or more light emitting unit 210 that is embedded at the cover body 140 to emit light to the light guide plate 160. The main body 120 includes at least a power supply contact 124 that is disposed on the bottom surface of the accommodating portion 122. The power supply contact 124 is electrically connected to the light emitting unit 210. When the electronic device 900 is received within the accommodating portion 122, the power supply contact 124 is electrically connected to a contact point (not shown) at the side of the electronic device 900 opposite to the screen 910. In such a way, the electronic device 900 provides the power for the light emitting unit 210 via the power supply contact 124.

In an embodiment, as shown in FIG. 9, the protective cover 100 further includes a control unit 230. The control unit 230 is embedded in the cover body 140. The main body 120 includes at least a signal contact 126 (such as a pogo pin) that is disposed at the bottom surface of the accommodating portion 122. The control unit 230 is electrically coupled to the light emitting unit 210 and the signal contact 126. The signal contact 126 is electrically connected to a contact point (not shown), such as a pogo pin at the side of the electronic device 900 opposite to the screen 910 to receive a trigger signal from the electronic device 900. In an embodiment, the control unit 230 is a microcontroller which controls the light emitting unit 210 to emit the light according to the trigger signal. In the embodiment, the trigger signal is generated corresponding to a trigger event.

In an embodiment, as shown in FIG. 9, the protective cover 100 further includes a fixing member 250. The fixing member 250 is disposed at the cover body 140. The cover body 140 is detachably attached to the main body 120 via the fixing member 250. Thus, the cover body 140 covers the screen of the electronic device stably when the electronic device is carried. In addition, the light emitted from the screen 910 is fully transmitted by the light guide plate 160 to the light output surface 168. As a result, the intensity of the light that comes out of the light output surface 168 is stronger. In an embodiment, the fixing member 250 is a magnet, a fastener, gecko glue or a VELCRO tape, which is not limited herein.

Figure 10:
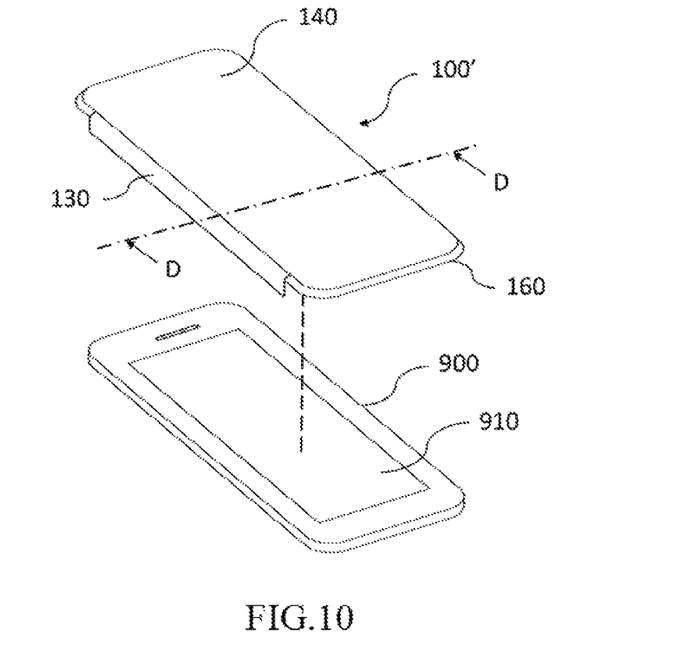
FIG. 10 is an exploded view of an electronic device and a protective cover in an embodiment.
Figure 11:
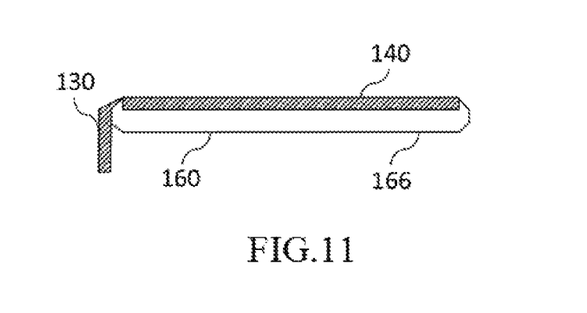
FIG. 11 is a section view of the protective cover along a line D-D in FIG. 10 in an embodiment.

FIG. 10 is an exploded view of an electronic device 900 and a protective cover 100' in an embodiment. FIG. 11 is a section view of the protective cover 100' along a line D-D in FIG. 10 in an embodiment. Please refer to FIG. 10 and FIG. 11, in the embodiment, the protective cover 100' comprises the connecting portion 130 and the cover body 140. The connecting portion 130 is removably attached to the lateral side of the electronic device 900, for example, via a magnetic unit or a connecting component at the connecting portion 130.

Figure 12:
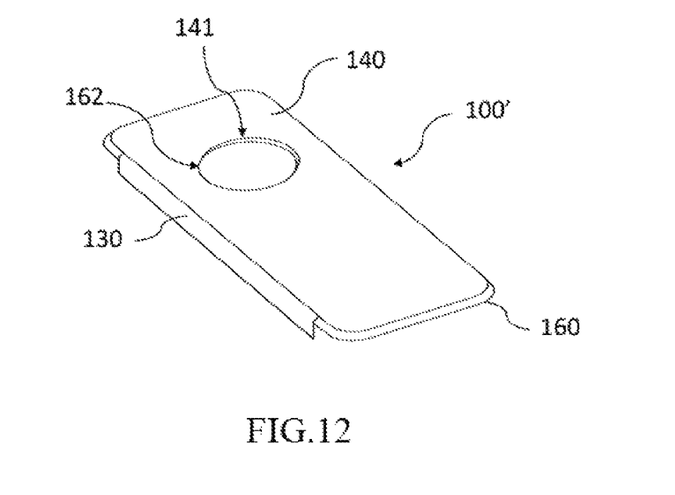
FIG. 12 is a perspective view of a protective cover in an embodiment.
Figure 13:
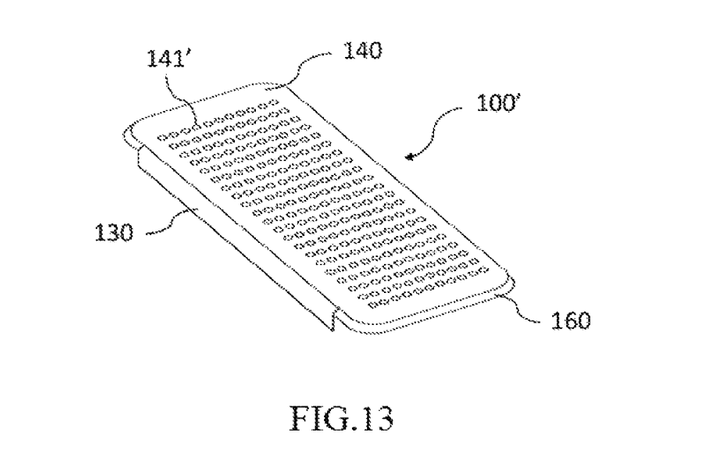
FIG. 13 is a perspective view of a protective cover in an embodiment.

FIG. 12 is a perspective view of a protective cover 100' in an embodiment. FIG. 13 is a perspective view of a protective cover 100' in an embodiment. Please refer to FIG. 12 and FIG. 13. In an embodiment, the opening(s) 141 or 141' is formed at the cover body 140 of the protective cover 100' as shown in FIG. 6A and FIG. 7A. In an embodiment, the shading body 180 shown in FIG. 7C is selectively included in the protective cover 100', which is omitted in FIG. 12 and FIG. 13.

Figure 14:
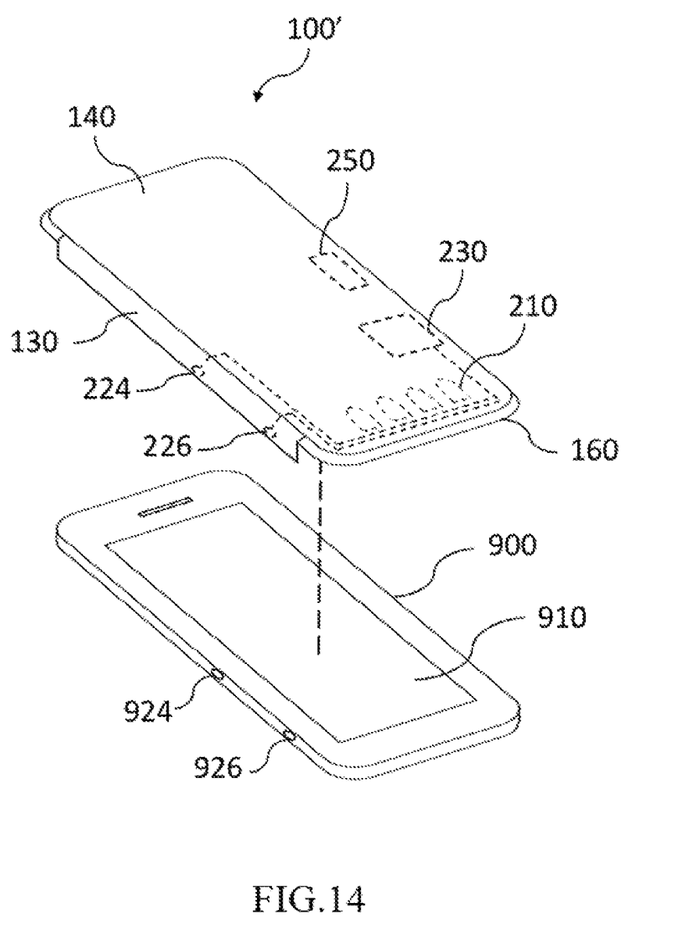
FIG. 14 is an exploded view of an electronic device and a protective cover in an embodiment.

FIG. 14 is an exploded view of an electronic device 900 and a protective cover 100' in an embodiment. As shown in FIG. 14, like the protective cover 100' shown in FIG. 9, the protective cover 100' further includes the light emitting unit(s) 210, the control unit 230 and the fixing member 250 that are embedded at the cover body 140. The difference between this embodiment and that in FIG. 9 is the power supply contact 224 and the signal contact 226 that configured at the connecting portion 130. A power supply contact 924 and a signal contact 926 are configured at a side of the electronic device 900 and corresponding to the power supply contact 224 and the signal contact 226 of the connecting portion 130. In the embodiment, the power supply contact 924 and the signal contact 926 are configured to provide the power and the trigger signal to the light emitting unit 210 when they contact with the power supply contact 224 and the signal contact 226.

In an embodiment, only the light emitting unit 210 is configured at the cover body 140. In an embodiment, both the light emitting unit 210 and the control unit 230 are configured at the cover body 140. In an embodiment, the light emitting unit 210 and the fixing member 250 are configured at the cover body 140, and the power supply contact 224 is configured at the connecting portion 130. In an embodiment, only the fixing member 250 is configured at the cover body 140.

In sum, in the embodiments, when the electronic device is covered by the protective cover, the triggered events or information that displayed on the electronic device are noticed by different light effects. Light effects are formed by utilizing the light guide plate of the protective cover to transmit the light from the electronic device. In addition, the opening of the protective cover is disposed according to the requirements to form different light effects. For increasing the application of the protective cover, the light guide plate is configured to include multiple sub-plates corresponding to the fold(s) of the protective cover. Thus, the protective cover can be folded to form a stand for supporting the electronic device 900.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A protective cover, adaptive to an electronic device, comprising:
   a connecting portion;
   a cover body, wherein a side portion of the cover body is connected to the connecting portion; and
   a light guide plate including a light input surface, an attachment surface, and a light output surface, wherein the light input surface and the attachment surface are opposite to each other, the light guide plate is connected to the cover body via the attachment surface and a portion of the light guide plate is covered by the cover body, and light from a light source is transmitted through the light input surface and output from the light output surface.

2. The protective cover according to claim 1, wherein the protective cover further includes a main body connected with the connecting portion, the main body includes an accommodating portion, and the accommodating portion is covered or exposed by converting the cover body.

3. A protective cover, adaptive to an electronic device, comprising:
   a connecting portion;
   a cover body, wherein a side portion of the cover body is connected to the connecting portion; and
   a light guide plate including a light input surface, an attachment surface, and a light output surface, the light input surface and the attachment surface are opposite to each other, the light guide plate is connected to the cover body via the attachment surface, and light from a light source is transmitted through the light input surface and output from the light output surface, wherein the cover body includes at least a first opening, the light guide plate includes a second opening corresponding to the first opening, the second opening is smaller than the first opening, and an inner side wall of the second opening extends to an inner edge of the first opening to expose the light output surface.

4. The protective cover according to claim 1, wherein the cover body includes at least a first opening, the protective cover further includes a shading body, and the shading body includes at least a third opening corresponding to the first opening.

5. The protective cover according to claim 1, wherein a thickness of the light output surface of the light guide plate is larger than a distance between the light input surface and the attachment surface.

6. The protective cover according to claim 1, wherein the light guide plate extends to a periphery of the cover body.

7. A protective cover, adaptive to an electronic device, comprising:
   a connecting portion;
   a cover body, wherein a side portion of the cover body is connected to the connecting portion; and
   a light guide plate including a light input surface, an attachment surface, and a light output surface, the light input surface and the attachment surface are opposite to each other, the light guide plate is connected to the cover body via the attachment surface, and light from a light source is transmitted through the light input surface and output from the light output surface, wherein a plurality of sub-plates are further defined on the light guide plate.

8. The protective cover according to claim 1, wherein the protective cover further includes at least a light emitting unit that is embedded at the cover body, and the connecting portion further includes at least a power supply contact that is electrically connected to the light emitting unit.

9. The protective cover according to claim 2, wherein the main body includes at least a power supply contact disposed at the bottom of the accommodating portion, and the power supply contact is electrically connected to a least a light emitting unit of the cover body.

10. The protective cover according to claim 8, wherein the protective cover further includes a control unit disposed at the cover body and at least a signal contact disposed at the connecting portion, the control unit is electrically connected with the light emitting unit and the signal contact, the signal contact receives a trigger signal from the electronic device, and the control unit controls the light emitting unit to emit light according to the trigger signal.

11. The protective cover according to claim 9, wherein the protective cover further includes a control unit that is embedded at the cover body, the control unit is electrically connected to the light emitting unit, the main body includes at least a signal contact disposed the bottom of the receiving slot to receive a trigger signal from the electronic device, and the control unit controls the light emitting unit to emit light according to the trigger signal.

12. The protective cover according to claim 1, wherein the protective cover further includes a fixing member disposed at the cover body for detachably attaching to the main body.

* * * * *